United States Patent
Eschbach et al.

(10) Patent No.: US 7,852,515 B2
(45) Date of Patent: Dec. 14, 2010

(54) INFRARED ENCODING FOR EMBEDDING MULTIPLE VARIABLE DATA INFORMATION COLLOCATED IN PRINTED DOCUMENTS

(75) Inventors: Reiner Eschbach, Webster, NY (US); Farzin Blurfrushan, Torrance, CA (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 695 days.

(21) Appl. No.: 11/758,388

(22) Filed: Jun. 5, 2007

(65) Prior Publication Data

US 2008/0304696 A1     Dec. 11, 2008

(51) Int. Cl.
     *G06K 9/00*     (2006.01)
(52) U.S. Cl. .................. 358/3.28; 358/1.1; 382/100
(58) Field of Classification Search ............... 358/1.1, 358/3.28, 540, 450; 382/100, 163
     See application file for complete search history.

(56) References Cited

U.S. PATENT DOCUMENTS

| | | | |
|---|---|---|---|
| 3,870,528 A | 3/1975 | Edds et al. | |
| 4,603,970 A | 8/1986 | Aota et al. | |
| 5,514,860 A | 5/1996 | Berson | |
| 5,734,752 A | 3/1998 | Knox | |
| 6,138,913 A | 10/2000 | Cyr et al. | |
| 6,731,785 B1 | 5/2004 | Mennie et al. | |
| 7,070,252 B2 | 7/2006 | de Queiroz et al. | |
| 7,099,019 B2 | 8/2006 | Silverbrook et al. | |
| 7,127,112 B2 | 10/2006 | Sharma et al. | |
| 7,136,522 B2 * | 11/2006 | Harrington et al. ......... 382/166 |
| 7,215,817 B2 | 5/2007 | de Queiroz et al. | |
| 2005/0078851 A1 | 4/2005 | Jones et al. | |
| 2007/0017990 A1 | 1/2007 | Katsurabayashi et al. | |

OTHER PUBLICATIONS

Eschbach et al., U.S. Appl. No. 11/758,344, filed simultaneously herewith, entitled "Infrared Encoding of Security Elements Using Standard Xerographic Materials".
Bala et al., U.S. Appl. No. 11/708,313, filed Feb. 20, 2007, entitled "Substrate Fluorescence Mask Utilizing a Multiple Color Overlay for Embedding Information in Printed Documents".
Bala et al., U.S. Appl. No. 11/382,897, filed May 11, 2006, entitled "Substrate Fluorescence Mask for Embedding Information in Printed Documents".
Bala et al., U.S. Appl. No. 11/382,869, filed May 11, 2006, entitled "Substrate Fluorescence Pattern Mask for Embedding Information in Printed Documents".
Bala et al., U.S. Appl. No. 11/754,702, filed May 29, 2007, entitled "Substrate Fluorescent Non-Overlapping Dot Patterns for Embedding Information in Printed Documents".

* cited by examiner

*Primary Examiner*—Thomas D Lee
(74) *Attorney, Agent, or Firm*—Fay Sharpe LLP (57) ABSTRACT

A watermark can be embedded in an image that has the property of being relatively indecipherable under normal light by including a distraction pattern, and yet remains decipherable under infrared illumination when viewed by a suitable infrared sensitive instrument. This infrared mark comprises, a substrate reflective to infrared radiation, a foreground colorant mixture printed as an image upon the substrate, a background colorant mixture and a distraction colorant mixture. A resultant collocated image rendered substrate suitably exposed to an infrared illumination, will yield a discernable image evident as a infrared mark to a suitable infrared sensitive device, but remain undecipherable under normal ambient light.

21 Claims, 5 Drawing Sheets

INFRARED ENCODING FOR EMBEDDING MULTIPLE VARIABLE DATA INFORMATION COLLOCATED IN PRINTED DOCUMENTS

CROSS-REFERENCE TO RELATED APPLICATIONS

Cross-reference is made to the following applications which are incorporated by reference for their teachings in their entirety herein: Eschbach et al., U.S. patent application Ser. No. 11/758,344, filed simultaneously herewith, entitled "INFRARED ENCODING OF SECURITY ELEMENTS USING STANDARD XEROGRAPHIC MATERIALS"; Bala et al., U.S. patent application Ser. No. 11/708,313, filed Feb. 20, 2007, entitled "SUBSTRATE FLUORESCENCE MASK UTILIZING A MULTIPLE COLOR OVERLAY FOR EMBEDDING INFORMATION IN PRINTED DOCUMENTS"; Bala et al., U.S. patent application Ser. No. 11/382,897, filed May 11, 2006, entitled "SUBSTRATE FLUORESCENCE MASK FOR EMBEDDING INFORMATION IN PRINTED DOCUMENTS"; Bala et al., U.S. patent application Ser. No. 11/382,869, filed May 11, 2006, entitled "SUBSTRATE FLUORESCENCE PATTERN MASK FOR EMBEDDING INFORMATION IN PRINTED DOCUMENTS"; and Bala et al., U.S. patent application Ser. No. 11/754,702, filed May 29, 2007, entitled "SUBSTRATE FLUORESCENT NON-OVERLAPPING DOT PATTERNS FOR EMBEDDING INFORMATION IN PRINTED DOCUMENTS".

BACKGROUND AND SUMMARY

This disclosure relates generally to methods and systems for steganographically embedding information, and more particularly to a system and method for utilizing a multiple color overlay to embed infrared information in documents and/or images collocated with human visible information.

Current digital document counterfeit prevention systems are mainly based on the use of digital watermarks, a technique which permits the insertion of information (e.g., copyright notices, security codes, identification data, etc.) to digital image signals and documents. Such data can be in a group of bits describing information pertaining to the signal or to the author of the signal (e.g., name, place, etc.). Most common watermarking methods for images work in spatial or frequency domains, with various spatial and frequency domain techniques used for adding watermarks to and removing them from signals.

For spatial digital watermarking the simplest method involves flipping the lowest-order bit of chosen pixels in a gray scale or color image. This works well only if the image will not be subject to any human or noisy modification. A more robust watermark can be embedded in an image in the same way that a watermark is added to paper. Such techniques may superimpose a watermark symbol over an area of the picture and then add some fixed intensity value for the watermark to the varied pixel values of the image. The resulting watermark may be visible or invisible depending upon the value (large or small, respectively) of the watermark intensity.

Spatial watermarking can also be applied using color separation. In this approach, the watermark appears in only one of the color bands. This type of watermark is visibly subtle and difficult to detect under normal viewing conditions. However, when the colors of the image are separated for printing or xerography, the watermark appears immediately. This renders the document useless to the printer unless the watermark can be removed from the color band. This approach is used commercially for journalists to inspect digital pictures from a stock photo agency before buying un-watermarked versions.

Alternatively, another approach uses infrared (IR) ink rendering to encode a watermark that is not visible under normal illumination, but revealed under IR illumination to a suitable infrared sensitive device such as a infrared sensitive camera. The traditional approach, often used, is to render a watermark with special infrared (IR) inks and to subsequently identify the presence or absence of the watermark in a proffered document using simple infrared illumination and sensing. However, these inks are costly to employ, generally requiring additional workflow steps, and as a result are typically economically viable only in offset printing scenarios, and therefore only truly avail themselves to long print runs. Additionally, these materials are often difficult to incorporate into standard electrophotographic or other non-impact printing systems like solid ink printers, either due to cost, availability or physical/chemical properties. This in turn particularly discourages their use in variable data printing arrangements, such as for redeemable coupons, for example.

There is well established understanding in the printing industry regarding the utilization of infrared material inks in combination with infrared light sources and sensors as employed for security marks, particularly as a technique to deter counterfeiting. However, there remains a long standing need for an approach to such a technique which will provide the same benefit but with lower complexity and cost, particularly in a digital printing environment, using only common consumables.

All U.S. patents and published U.S. patent applications cited herein are fully incorporated by reference. The following patents or publications are noted:

U.S. Patent Application Publication No. 2005/0078851 to Jones et al. ("Multi-channel Digital Watermarking") describes a system for providing digital watermarks through multiple channels. The channels can include visible, ultraviolet and infrared channels. The non-visible channels can be selected to respond either in the visible or IR/UV spectrums upon the appropriate illumination in the infrared or ultraviolet spectrums. The watermarks in the various multiple channels can cooperate to facilitate watermark detection or to authenticate an object in which the watermarks are embedded.

U.S. Pat. No. 7,127,112 to Sharma et al. ("Systems for Spectral Multiplexing of Source Images to Provide a Composite Image, for Rendering the Composite Image, and for Spectral Demultiplexing of the Composite Image by Use of an Image Capture Device") provides methods and systems for spectrally-encoding plural source images and for providing the spectrally-encoded plural source images in a composite image, for rendering the composite image on a substrate, and for recovering at least one of the encoded source images from the rendered composite image. A desired source image is recovered when the rendered composite image is subjected to illumination by one or more illuminants and the desired source image is detected by one or more sensors in an image capture device. The spectral characteristics of the colorants, illuminants, and sensors are employed to spectrally encode the source image in the composite image.

The disclosed embodiments which follow below provide examples of improved solutions to the problems noted in the above background discussion and the art cited therein. There is shown in these examples a method for creation of an infrared mark with distraction pattern to be printed by a printing device as an image on a substrate for embedding information in printed documents. The method comprises providing a substrate reflective of infrared, and selecting at least one background color mixture for the infrared mark. The method also teaches selecting at least one foreground color mixture for the infrared mark, the at least one foreground color mixture exhibiting low contrast against the at least one background color mixture under normal illumination, and high contrast against the at least one background color mixture under infrared illumination. The method further comprises selecting at least one distraction color mixture for the infrared mark. This at least one distraction color mixture is comprised of at least two colors. The at least one distraction color mixture as selected has a substantially negligible effect on the infrared response of the foreground and background color mixtures, as well as having a substantially noticeable effect of the visual response of the least one foreground color mixture and the least one background color mixture. The method also comprises creating an infrared mark using the foreground color mixture against the background color mixture, and creating a distraction pattern using the distraction color mixture as collocated with the infrared mark.

In yet another embodiment there is disclosed a method for creation of an infrared mark to be printed by a printing device as an image on a substrate for embedding information in printed documents. The method comprises providing a substrate reflective of infrared and selecting at least one background color mixture for the infrared mark. The method further comprises selecting at least one foreground color mixture for the infrared mark, the at least one foreground color mixture exhibiting low contrast against the at least one background color mixture under normal illumination, and high contrast against the at least one background color mixture under infrared illumination. The method further comprises selecting at least one distraction color mixture for the infrared mark, the at least one distraction color mixture comprised of at least two colors, the at least one distraction color mixture having a substantially negligent-negligible effect on the infrared response of the foreground and background color mixtures, as well as having a substantially noticeable effect of the visual response of the least one foreground color mixture and the least one background color mixture. The method thus creating an infrared mark using the foreground color mixture against the background color mixture in close spatial proximity, with a distraction pattern using the distraction color mixture as collocated with the foreground color mixture against the background color mixture.

In an alternate embodiment there is disclosed a system for an infrared mark as rendered by a conventional printing device as an image on a substrate comprising a substrate reflective of infrared with at least one background color mixture for the infrared mark and at least one foreground color mixture for the infrared mark, the at least one foreground color mixture exhibiting low contrast against the at least one background color mixture under normal illumination, and high contrast against the at least one background color mixture under infrared illumination. The embodiment further includes at least one distraction color mixture for the infrared mark, the at least one distraction color mixture comprised of at least two colors, the at least one distraction color mixture having a substantially negligible effect on the infrared response of the at least one foreground and background color mixtures, as well as having a substantially noticeable effect of the visual response of the at least one foreground color mixture and the at least one background color mixture. Thus an infrared mark is created by using the at least one foreground color mixture imaged as arranged in close spatial proximity against the at least one background color mixture, with a distraction pattern imaged using the at least one distraction color mixture as collocated with the at least one foreground color mixture in close spatial proximity against the at least one background color mixture.

In a further embodiment there is disclosed a method for creation of an infrared mark to be printed by a printing device as an image on a substrate for embedding information in printed documents. The method comprises providing a substrate reflective of infrared, selecting at least one background color mixture for the infrared mark and selecting at least one foreground color mixture for the infrared mark, the at least one foreground color mixture exhibiting low contrast against the at least one background color mixture under normal illumination, and high contrast against the at least one background color mixture under infrared illumination. The method further includes selecting at least one distraction color mixture for the infrared mark, the at least one distraction color mixture comprised of at least two colors, the at least one distraction color mixture having a substantially negligible effect on the infrared response of the foreground and background color mixtures, as well as having a substantially noticeable effect of the visual response of the least one foreground color mixture and the least one background color mixture. The method also comprises printing the image background with the at least one background color mixture, along with printing the image foreground with the at least one foreground color mixture, and overprinting a distraction pattern with the at least one distraction color mixture to create an infrared mark using the at least one foreground color mixture against the at least one background color mixture, with a distraction pattern using the at least one distraction color mixture as collocated with the at least one foreground color mixture against the at least one background color mixture.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

For the purposes of clarity, the following term definitions are provided:

Color: A color can be uniquely described by three main perceptual attributes: hue, denoting whether the color appears to have an attribute according to one of the common color names, such as red, orange, yellow, green, blue, or purple (or some point on a continuum); colorfulness, which denotes the extent to which hue is apparent; and brightness, which denotes the extent to which an area appears to exhibit light. Light sources used to illuminate objects for viewing are typically characterized by their emission spectrum and to a reduced degree by their color temperature, which is primarily relevant for characterization of sources with a spectrum similar to a black body radiator. See, for instance, Hunt, R. W. G., *Measuring colour*, Ellis Horwood, 1991, and Billmeyer and Saltzman, *Principles of Color Technology*, 3$^{rd}$ Ed. (Roy S. Berns), John Wiley & Sons, 2000.

Colorant: A dye, pigment, ink, or other agent used to impart a color to a material. Colorants, such as most colored toners, impart color by altering the spectral power distribution of the light they receive from the incident illumination through two primary physical phenomenon: absorption and scattering. Color is produced by spectrally selective absorption and scattering of the incident light, while allowing for transmission of the remaining light. For example, cyan, magenta and yellow colorants selectively absorb long, medium, and short wavelengths respectively in the spectral regions. Some colorants, such as most colored toners, impart color via a dye operable in transmissive mode. Other suitable colorants may operate in a reflective mode.

Metameric rendering/printing: the ability to use multiple colorant combinations to render a single visual color, as can be achieved when printing with more than three colorants.

Infrared Mark: A watermark embedded in the image that has the property of being relatively indecipherable under normal light, and decipherable under infrared light using suitable infrared sensitive devices.

Image: An image may be described as an array or pattern of pixels that are mapped in a two-dimensional format. The intensity of the image at each pixel is translated into a numerical value which may be stored as an array that represents the image. An array of numerical values representing an image is referred to as an image plane. Monochromatic or black and white (gray scale) images are represented as a two-dimensional array where the location of a pixel value in the array corresponds to the location of the pixel in the image. Multicolor images are represented by multiple two-dimensional arrays.

Illuminant: A source of incident luminous energy specified by its relative spectral power distribution.

Image plane: A two-dimensional representation of image data. For example the uppercase letters C, Y, M, K are used to indicate two-dimensional arrays of values representing cyan, magenta, yellow and key (black) components of a polychromatic (multicolor) image. Two-dimensional arrays of values may also be referred to as "planes". For example, the Y plane refers to a two-dimensional array of values that represent the yellow component at every location (pixel) of an image.

Composite Image: An array of values representing an image formed as a composite of plural overlaid (or combined) colorant image planes. Source images may be encoded as described herein and the resulting image planes are combined to form a composite image.

Imaging Device: A device capable of generating, capturing, rendering, or displaying an image; including devices that store, transmit, and process image data. A color imaging device has the capability to utilize color attribute information.

Luminance: A photometric measure describing the amount of light that passes through or is emitted from a particular area, and falls within a given solid angle. Luminance indicates how much luminous power will be perceived by the human eye looking at the surface from a particular angle of view. It is therefore an indicator of how bright a surface will appear.

Security document: A paper or document having a value so as to render it vulnerable to attempts at counterfeiting or unauthorized copying, be this value real or perceived.

It is known to utilize infrared material inks to ensure document security. See, for example, U.S. Patent Application No. 2007/0017990 A1 to Katsurabayashi et al., which is herein incorporated by reference in its entirety for its teachings. However, these inks are costly and are often difficult to incorporate into standard electrophotographic or other non-impact printing systems, such as solid ink printers, due to cost, availability or physical/chemical properties.

An alternate approach is to incorporated the different characteristics of standard colorants in the infrared domain through a selective and guided use of common metameric printing. In this approach, use is made of the high reflectance of common paper substrates under infrared illumination. Coupled with the high transmissivity of standard chromatic colorants (e.g.: standard cyan, magenta and yellow) to infrared wavelength and the high absorption of standard black colorant—commonly carbon black—to infrared wavelength, sets of colorant mixtures can be found with an reasonable identical visual response, but a distinctively different infrared response, as described in co-pending application Ser. No. 11/758,344 "Infrared Encoding Of Security Elements Using Standard Xerographic Materials" incorporated by reference above.

An infrared watermark (termed herein as an "Infrared Mark") is embedded in a printed document by selectively masking the substrate reflectance to infrared with standard C, M, Y, K colorants as used in digital color printing. A challenge in this approach is to design two colors that match under normal illumination, and yet exhibit significant contrast under infrared light. This is conceptually illustrated in FIG. 1, where it is assumed, for the simplicity of illustration, that some form of luminance component (labeled Y) is used to describe the color of the patterns. In the standard case, the two colors 110 and 120 should match under a normal illuminant (for example, illuminant A), but one color 110 would be considerably lighter than the other color 120 under infrared illumination to a suitable device.

Suitable devices in the context of infrared marks are sensors that can distinguish the amount of infrared radiation being reflected from a surface like a printing substrate, or being transmitted from a substrate. Note that for the purpose of simplicity of description herein but not to be limited to such, we assume for example an infrared reflective substrate such as common printing paper or the like.

Figure 1:
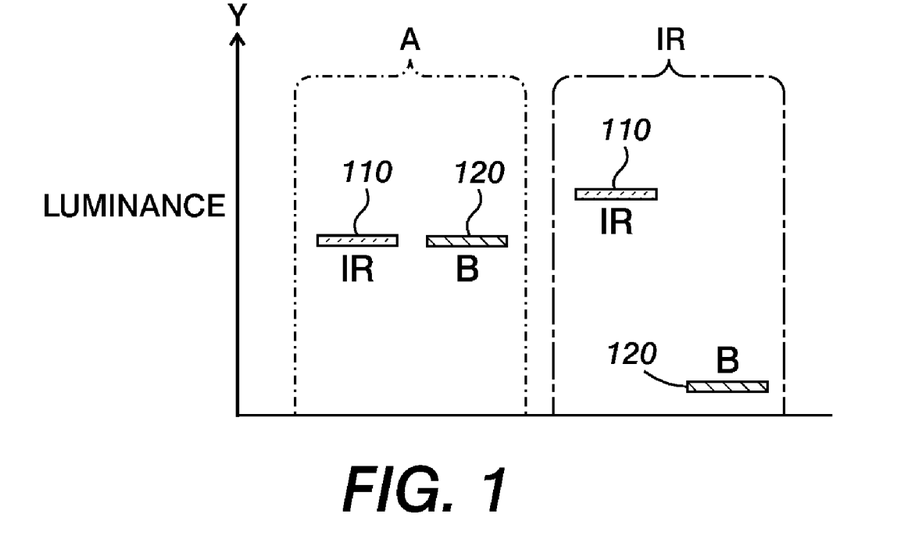
FIG. 1 is a conceptual illustration depicting two color which match under normal illumination but differ under infrared illumination to a suitable device.

As can be seen from FIG. 1, colors 110 and 120 might be functionally identical when typically perceived by the human eye in passing, but closer scrutinizing inspection might nevertheless reveal a difference in the two colors as patterned. Particularly if the observer knows to look for it. The reasons for this can for example be caused by an incorrect color match due to printer imprecision/drift, and/or an incorrect match due to inherent calibration limitations, or alternatively as based on other observational differences involving other colorant rendering attributes, such as gloss. What is described herein below overcomes these issues by teaching a further technique which makes an infrared mark that is increasingly difficult and even impossible for an unaided eye to discern absent the necessary infrared set-up, by virtue of the incorporation of a second variable information print substantially collocated with the infrared mark.

This collocated variable information will be printed in the same physical area as the infrared mark and in such a manner that the variable information is clearly visible and stronger than any anticipated contrast of the metameric infrared mark caused by any of the above mentioned error sources.

Figure 2:
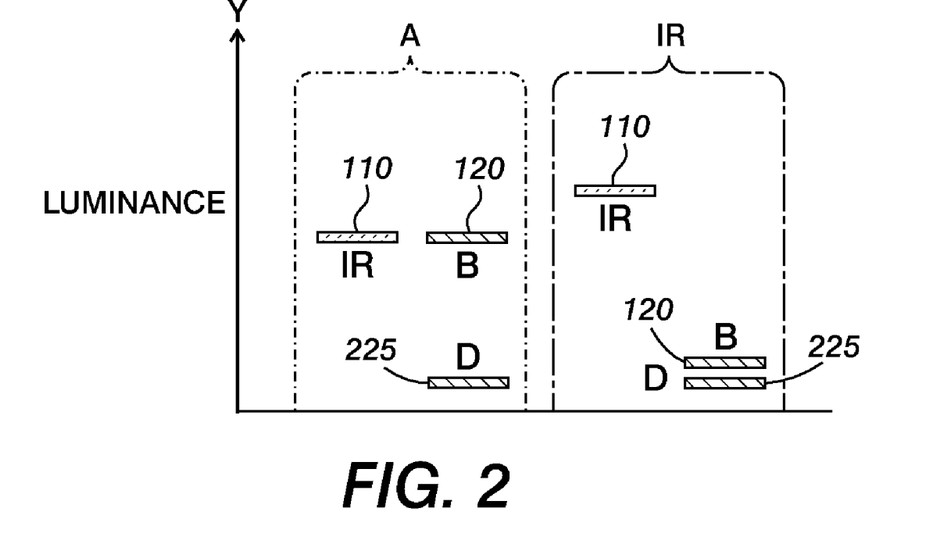
FIG. 2 is a further conceptual illustration similar to FIG. 1 but introducing a distraction color.

The encryption approach described herein employs a minimum set of three colors in the infrared mark: background color B, Infrared Mark color $IR_v$, and distraction color D designed with the following properties. Under normal light, the infrared mark color blends into the background, while the distraction text exhibits high contrast against the background and is thus strongly visible. Under infrared light, the situation is reversed—the distraction color blends into the background and the infrared mark/text exhibits high contrast, becoming highly visible. This is illustrated in FIG. 2. As shown in FIG. 2, the contrast of the distraction color 225 against the background color 120 and the infrared mark color 110 under illuminant A, normal light, is sufficiently significant that any imprecision in the match between the infrared mark and background under illuminant A can be substantially masked by the high contrast "noise" distraction text/pattern of distraction color 225. Under infrared illumination, the situation reverses and the grouping changes, effectively turning the "noise" color into signal. Here the contrast between the distraction color 225 and the background color 120 is not significant and the infrared color 110 becomes readily visible.

Thus a minimum of only three colors need to be defined, with effectively less stringent requirements on color matching. Simultaneously, the distraction amplitude under nominally room ambient illuminant A is effectively eliminated under infrared light, leading to a higher signal-to-noise ratio. An additional advantage to the three-color overlay approach as disclosed herein is that distraction patterns may be utilized, since they effectively disappear under infrared illumination. A distraction pattern may be chosen to itself convey semantic content. Examples of semantic distraction patterns include text strings or icons. The advantage is that the user is more likely to be drawn towards a semantic distraction pattern than low-level image variations, and is thus less likely to notice and decipher a infrared mark under normal light. This enables greater tolerance and robustness in the design of the infrared mark.

Figure 3A:
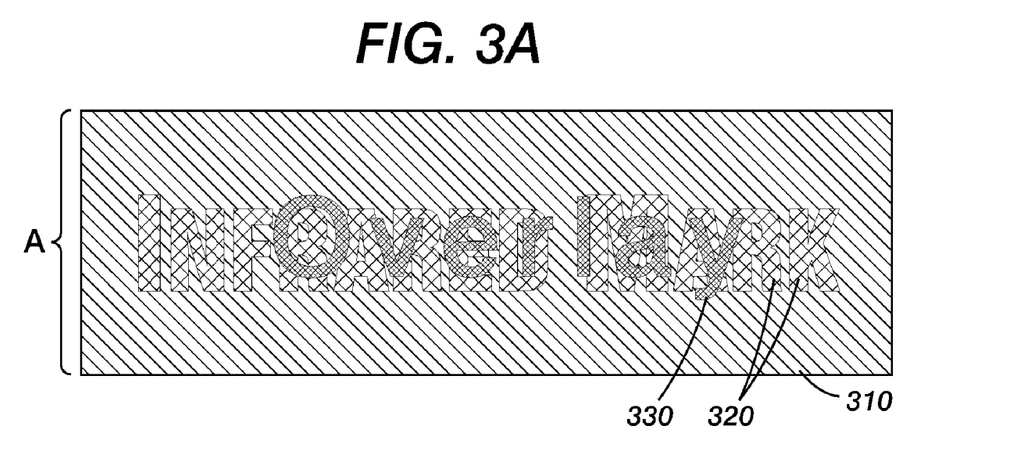
FIG. 3A is an illustration of the teachings herein for a multicolor substrate Infrared mark under normal illumination.
Figure 3B:
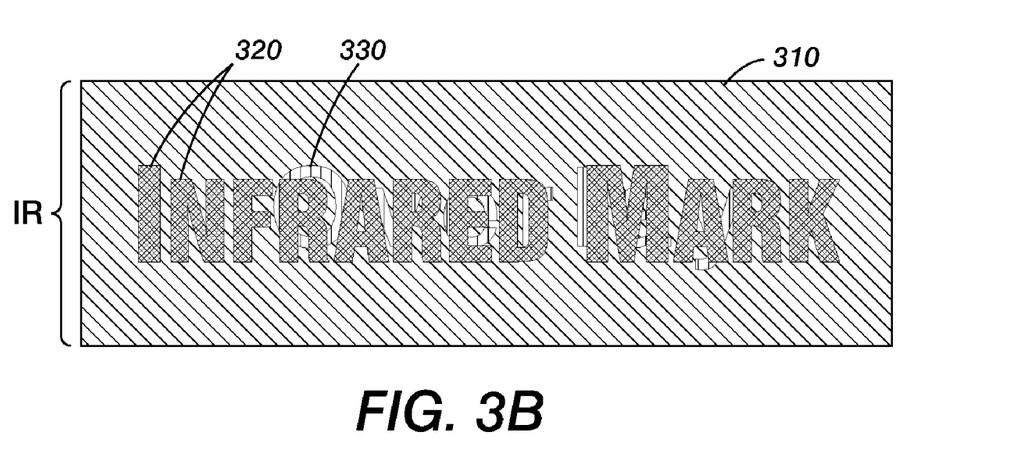
FIG. 3B is an illustration of the teachings herein for a multicolor substrate Infrared mark under IR illumination viewed by a suitable device.

FIGS. 3A and 3B provide depiction of one example of this semantic distraction pattern provided here as text semantic content. Here the background is rendered using one metameric colorant mixture 310 provided as having a high infrared reflectance caused by high infrared transmittance of the chromatic colorants and high substrate reflection from the paper. For both cases depicted in FIG. 3A and FIG. 3B respectively, the background colorant mixture serves as reference under illuminant A in FIG. 3A and infrared illumination in FIG. 3B. The second metameric colorant mixture 320 of low infrared reflectance e.g.: caused by high infrared absorption of common carbon black toner, is printed in substantially the same location as the background. The two metameric colorant mixtures will result in the same color under standard illumination, here for example illuminant A. In substantially the same location, a third color is used to print the semantic overlay 330. Under normal room ambient illumination, colorant mixtures 310 and 320 are metameric with colorant mixture 330 being visually distinct and thus the text message "Overlay" is visible. Under infrared illumination, the situation changes and colorant mixtures 310 and 330 are metameric for the infrared sensing device, while colorant 320 is distinctive to said device thus displaying the text string message "INFRARED MARK" as is depicted here in FIG. 3B.

The problem with the system described thus far is that for a collocation of infrared mark and distraction patterns, a single location on the substrate can only effectively exhibit one colorant mixture, and the simple schematical arrangement of FIG. 3 would require two different colors at a single location in areas where the infrared mark and distraction color are physically in the same location. It will be understood to one skilled in the art that an approximation of printing multiple colors to the same location can be achieved by spatial multiplexing following the methods disclosed in Ser. No. 11/758,344 in combination with the method outlined in U.S. patent application Ser. No. 11/708,313 incorporated by reference above. What is described herein below is a method to derive a set of four colors that to a very good approximation provide the above described relationship, while at the same time solving the printing issue well understood by those skilled in the art, that it is cumbersome if not impossible in standard printing systems to alter the printing color in any complex form as a function of previously printed colors.

Figure 4A:
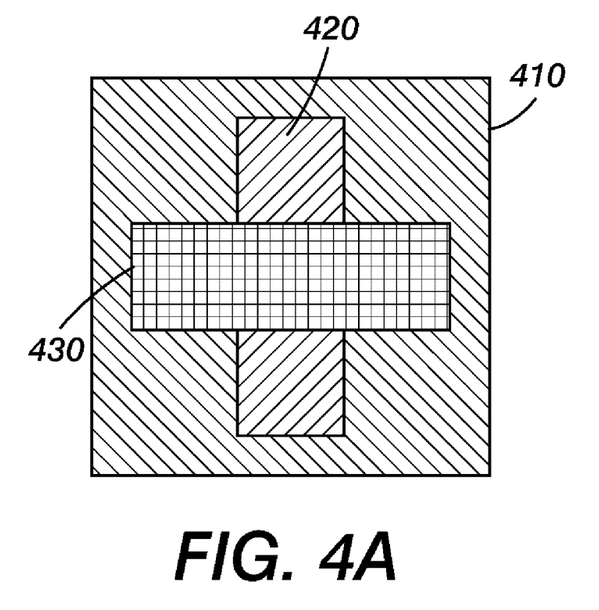
FIG. 4A is an illustration for a multicolor substrate Infrared mark under normal illumination.
Figure 4B:
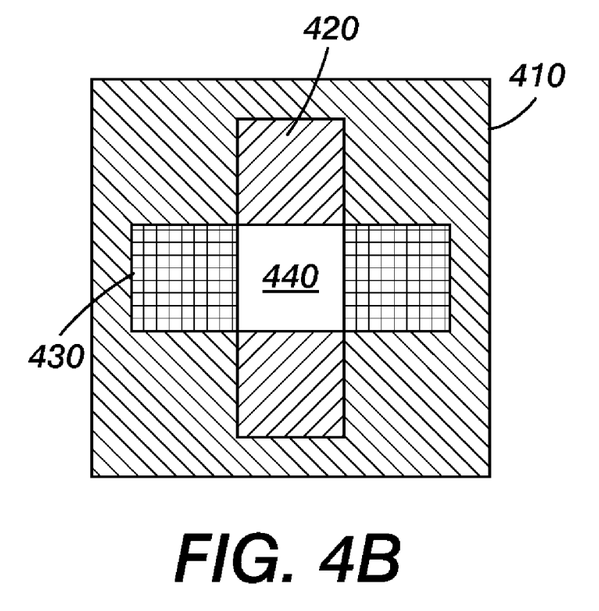
FIG. 4B is an illustration for a multicolor substrate Infrared mark and introduces a fourth colorant mixture to the mark of FIG. 4A.

This problem is further described by FIG. 4A and B, where FIG. 4A provides a depiction scenario simplified from that of FIG. 3, with 410 here indicating the background printed in a metameric match to the infrared mark colorant mixture 420 and a overlay colorant mixture 430 printed which exhibits a strong contrast to colorant mixture 410 and thus colorant mixture 420 under normal illumination, but is metameric to colorant mixture 410 under infrared illumination to a suitable sensing device. As can be seen in 4A, the intersection of colorant mixture 420 and colorant mixture 430 has to be printed in one colorant mixture and for the standard imaging model typical of digital printing, this will be the last requested colorant mixture, in this case colorant mixture 430. Under infrared illumination, the rectangle rendered with colorant mixture 420 will have a break where colorant mixture 430 is overlaid, since colorant mixture 430 is an infrared metameric to colorant mixture 410. In FIG. 4B, a fourth colorant mixture 440 is introduced at the overlap of colorant mixtures 420 and 430. The requirement for this colorant mixture is to be an infrared metameric to colorant mixture 420 and normal illuminant metameric to colorant mixture 430. Mathematically this can be described as:

$$Lab(410) \approx Lab(420)$$

$$Lab(430) \approx Lab(440)$$

$$IR(410) \approx IR(430)$$

$$IR(420) \approx IR(440)$$

where the shorthand notation "Lab(N)" was used to denote the visual perception for a human observer under normal illumination for colorant mixture indicated as "N" in FIG. 4, and "IR(M)" indicates the sensor response to the infrared set-up for colorant mixture indicated as "M" in FIG. 4. Also it will be understood by those skilled in the art, that while in an ideal situation a true equality of match between the colorant mixtures would be preferred, but that in real-world applications the match only needs to be performed to a quality level sufficient for the identified application.

An additional problem in implementing the system described above in FIGS. 3 and 4 is that standard print descriptions in digital printing do not allow for a simple inquiry as to the underlying colors already rendered onto the substrate. This means that a simple system laying down colorant mixture 430 on top of colorant mixture 410, does not have a readily available process for identifying the transition from an underlying colorant mixture 410 to the metameric colorant mixture 420. Thus the variable data overlay has no indication of when to switch from colorant mixture 430 to colorant mixture 440. It will be understood that this problem is compounded by the fact that variable data, such as character string data, is commonly rendered using a single color setting command in its page description.

Understanding that the application requirement is an approximate match and not a mathematically perfect match, one can address the above mentioned color requirement by introducing the concept of differential colors, where colorant mixture 430 is a differential to colorant mixture 410 and colorant mixture 440 is a differential to colorant mixture 420. One exemplary embodiment would have a differential color that is essentially neutral for the infrared set-up, in which case the infrared metameric character would be predominantly maintained. The differential colors can be defined as:

$$CMYK(430)=f\{CMYK(410)\}$$

$$CMYK(440)=f\{CMYK(420)\},$$

where CMYK refers to the respective colorant mixtures for the colorant mixtures indicated in FIG. 4. It is understood that a higher number of colorant mixtures can be used, and as such is well within the contemplation of this disclosure.

Another observation, as described above, is that the high infrared transmission of standard chromatic colorants is different from the low infrared transmission of the standard black colorant, often carbon black. Thus it may be found that for the precision required in most infrared marking applications the chromatic colorants can be treated as sufficiently transparent so as to be considered as not influencing the infrared component, and the black colorant can be treated as a sufficiently perfect infrared absorber. In this way the infrared metameric character can be obtained simply by maintaining the K component of the colorant mixture constant while variably modifying the CMY components of the colorant mixture in a predetermined way.

Figure 5:
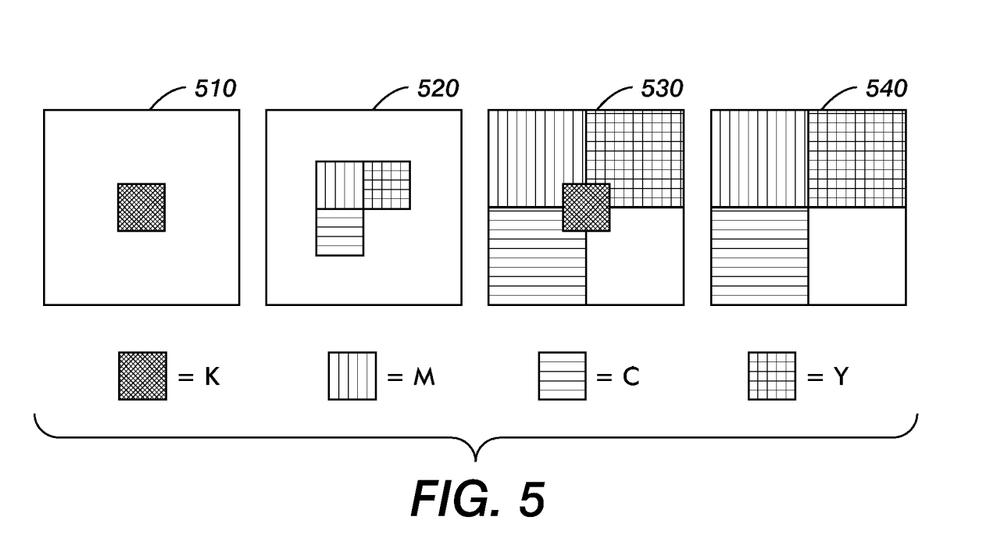
FIG. 5 depicts one exemplary embodiment example of colorant mixtures suitable in for an Infrared mark.

This scenario is further described in FIG. 5. Colorant mixtures 510 and 520 are visually metameric under normal operation, but clearly distinct for an infrared illumination set-up. For simplicity we may consider colorant mixture 510 to contain only the single colorant black, whereas the colorant mixture 520 contains only chromatic colorants cyan, magenta and yellow. Colorant mixtures 510 and 520 fulfill—for the purpose of the description—the relationships:

$$Lab(510)=Lab(520)$$

and $$IR(510)<<IR(520),$$

where we use the case that the chromatic colorants transmit the infrared radiation coupled by the infrared reflectivity of the substrate to indicate that the infrared signal derived from mixture 520 is sufficiently larger than the response from mixture 510 as defined by the application requirements.

Colorant mixtures 530 and 540 are derived from colorant mixtures 510 and 520 respectively by altering only the CMY components of the colorant mixtures, maintaining the K component, giving:

$$CMYK(530)=K(510)+C(530)+M(530)+Y(530),$$

$$CMYK(540)=K(520)+C(530)+M(530)+Y(530),$$

giving:

$$Lab(530)\approx Lab(540),$$

and $$IR(530)<<IR(540),$$

while having:

$$Lab(530/540)\neq Lab(510/520),$$

where the difference between the colorant mixture pair 530 and 540 on one side and the colorant mixture pair 510 and 520 on the other side is of sufficient contrast to satisfy the application requirements. This is effected by using chromatic colorant amounts CMY(530), that are substantially different from the chromatic colorant amounts CMY(510).

In FIG. 5 identical chromatic colorant amounts and modifications have been used, but it will be understood by those skilled in the art that any chromatic colorant modification can be used. For example, in a Postscript® page description language environment, the chromatic colorant modification can be obtained using the overprint construct (see PostScript® Language Reference Manual by Adobe Systems Incorporated, ISBN 0-201-18127-4). In that implementation the "Overlay" colorant mixture 330 of FIG. 3 is created using a chromatic colorant combination in the "overprint" state of the page description.

In a further example, using the overprint operator one can replace the cyan and/or magenta and/or yellow separation without influencing the other separations.

A simplified example for the colors—assuming linearity—would then be:

C1 = 20% K + 15% C + 20% M + 30% Y
C2 = 35% C + 40% M + 50% Y
C3 = 20% K + 90% C + 90% M + 90% Y
C4 = 90% C + 90% M + 90% Y where it is clear that C1≈C2≠C3≈C4 in the visible spectrum, but C1≈C3≠C2≈C4 in the IR spectrum.

With this restriction it becomes clear that in a more exemplary approach additional restrictions have to be enforced for the two base colors. Note that since the new colors are created by modifying the CMY components, enough variability has to be available. This is achieved by selecting very light colors where the overprint operator can be used to noticeably increase the CMY components individually, or together. For very dark colors this can be done by setting CMY to small amounts, however, for those skilled in the art it is apparent that this often does not lead to the desired effect, since the dark colors generally have a high K component which makes the removal of CMY more difficult, since the K deposited in the first instance can not be modified. For simplicity, an exemplary approach will therefore restrict itself to light colors, which also means that the CMY component will be small.

The particular methods performed for designing a infrared mask comprise steps described below with reference to a flow chart in FIG. 6. The flow chart illustrates an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 6:
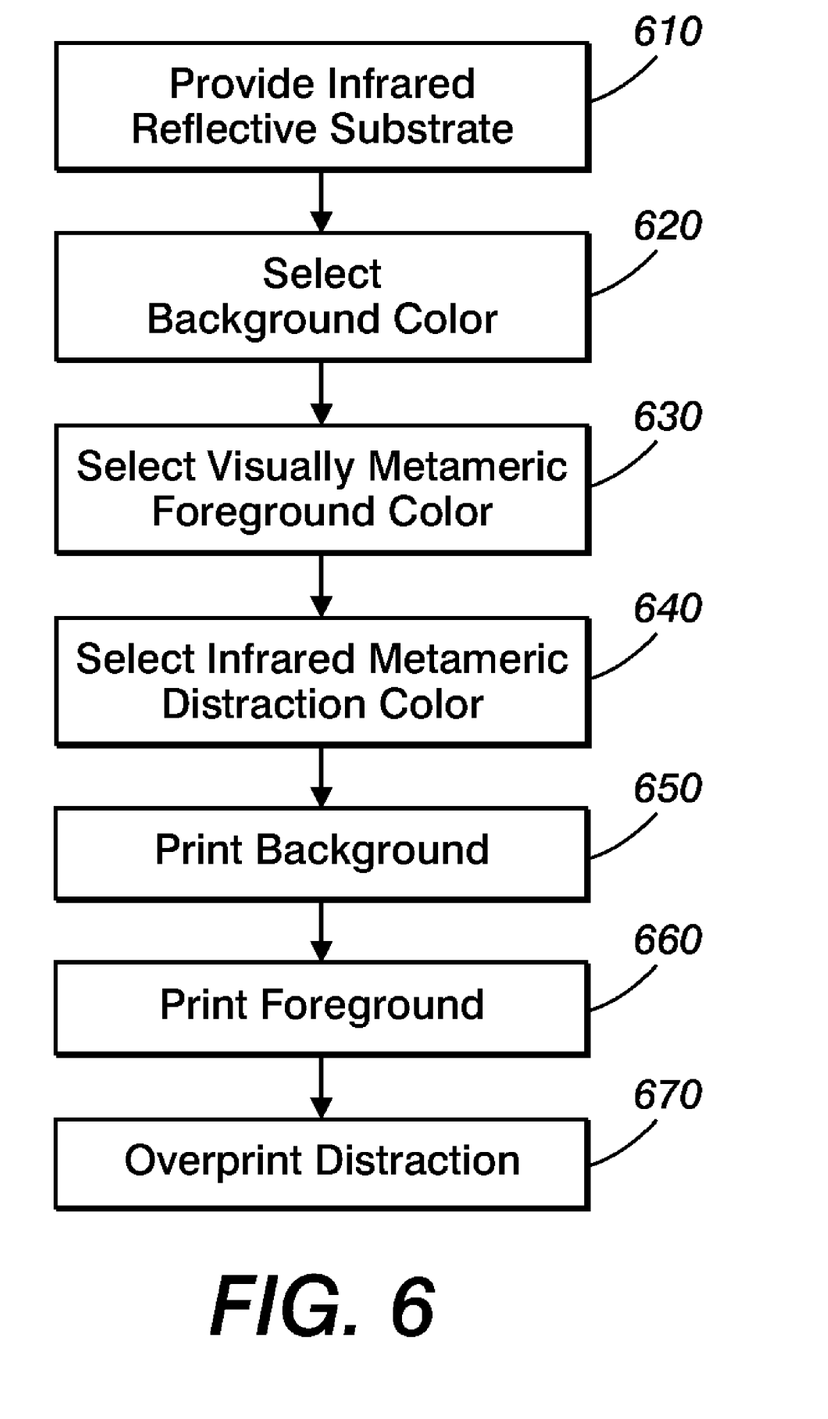
FIG. 6 depicts a flowchart that illustrates one process for creating a Infrared mark in accordance with the teachings herein.

Turning now to FIG. 6, a flowchart illustrates the process for creating a infrared mark in accordance with the disclosure herein. At 610 a suitable printing substrate is provided. The substrate may be any white or colored digital printing substrate of high infrared reflectance. Note that in a transmission scenario this requirement would be replaced by a transmissive substrate, everything else remaining the same.

The background color B is selected at 620. In one example embodiment, the method for color selection is structured such that a user may select B, and the remaining two colors are automatically derived from the B choice. In a more general embodiment, the user can be given a choice of foreground and distraction color in 630 and 640 noting that the foreground color choice is severely limited by the requirement of visual metameric behavior and is thus limited to visually identical colors having different colorant mixtures. In an exemplary embodiment, the foreground color would be directly selected through selection of the background color, while a small number of options will be given for the distraction color for aesthetic and design purposes. It is appreciated that steps 620, 630 and 640 can be performed in arbitrary order and that the automatic, semi-automatic or manual selection of the colors or colorant mixtures follows from the functional requirements after the first of the three colors/colorant mixtures are selected. This explicitly includes the case where the user selects a color and not a colorant mixture and foreground and background colorant mixtures are automatically selected from the selected visual color.

At step 650 the background pattern is first printed onto the substrate. Note that for practical purposes the background pattern is preferably the largest object spatially enclosing foreground and distraction pattern. At step 660 the foreground pattern is printed, replacing the background pattern on the substrate in all locations where foreground color is deposited. At step 670 the distraction color is deposited in a manner different from the standard printing operation as used in step 660, such that the infrared active colorant component—usually black—is not modified, while the other colorant components are replaced by new chromatic colorant components. In a Postscript® language environment this is achieved using the "overprint" construct, but this disclosure is intended to be equally applicable to other page description languages having functionally equivalent constructs.

In an exemplary embodiment at least one of the foreground or distraction components are created from a variable data stream, perhaps most commonly being a character string derived from relevant desired information. It is understood that both foreground and distraction components can be created from two separate variable data streams that are unrelated or functionally related. For example, the unrelated case might incorporate the company name as the foreground stream and the current date as the distraction stream of text. For a further example, the functionally related case might incorporate the recipient's first name as background data and the recipient's last name as a distraction data stream. It will be understood by those skilled in the art that the term distraction is used solely to describe the effect on the human color perception system, being neutral with respect to the actual relevance in terms of human recognizable information content.

While the present discussion has been illustrated and described with reference to specific embodiments, further modification and improvements will occur to those skilled in the art. For example, the colors could be generated with other special colorants in addition to the standard C, M, Y, K. Examples of such colorants could include low-load colorants (commonly cyan and magenta), orange, green, violet, etc.

It is also understood that in an exemplary embodiment the user is actually selecting visual colors without the need to define, understand or modify colorant mixtures and that the corresponding colorant mixtures are automatically derived or as another alternative that a set of colors is offered to the user for selection where the system has predetermined the corresponding colorant mixtures to fulfill the described criteria.

Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for creation of an infrared mark to be printed by a printing device as an image on a substrate for embedding information in printed documents, the method comprising:
providing a substrate reflective of infrared;
selecting at least one background color mixture for the infrared mark;
selecting at least one foreground color mixture for the infrared mark, the at least one foreground color mixture exhibiting low contrast against the at least one background color mixture under normal illumination, and high contrast against the at least one background color mixture under infrared illumination;
selecting at least one distraction color mixture for the infrared mark, the at least one distraction color mixture comprised of at least two colors, the at least one distraction color mixture having a substantially negligible effect on the infrared response of the foreground and background color mixtures, as well as having a substantially noticeable visual response under normal illumination of the least one foreground color mixture and the least one background color mixture; and, creating an infrared mark on the substrate using the foreground color mixture against the background color mixture in close spatial proximity, with a distraction pattern using the distraction color mixture as collocated with the foreground color mixture against the background color mixture.

2. The method for creation of an infrared mark of claim 1 further comprising where the foreground color mixture against the background color mixture is used to delineate text information.

3. The method for creation of an infrared mark of claim 2 further comprising where the distraction pattern using the distraction color mixture is used to delineate text information.

4. The method for creation of an infrared mark of claim 1 further comprising where the at least one background color mixture further comprises common carbon black toner.

5. The method for creation of an infrared mark of claim 4 further comprising where the at least one foreground color mixture is provided as entirely without common carbon black toner in its mixture.

6. The method for creation of an infrared mark of claim 1 further comprising where the distraction pattern using the distraction color mixture is used to delineate icons.

7. The method for creation of an infrared mark of claim 1 further comprising where the distraction pattern using the distraction color mixture is used to delineate a repeating pattern.

8. The method for creation of an infrared mark of claim 7 further comprising where the repeating pattern is a checker board pattern.

9. The method for creation of an infrared mark of claim 7 further comprising where the repeating pattern is a diamond pattern.

10. The method for creation of an infrared mark of claim 7 further comprising where the repeating pattern is a crosshatch pattern.

11. An infrared mark as rendered by a conventional printing device as an image on a substrate comprising:
    a substrate reflective of infrared;
    at least one background color mixture for the infrared mark;
    at least one foreground color mixture for the infrared mark, the at least one foreground color mixture exhibiting low contrast against the at least one background color mixture under normal illumination, and high contrast against the at least one background color mixture under infrared illumination; and,
    at least one distraction color mixture for the infrared mark, the at least one distraction color mixture comprised of at least two colors, the at least one distraction color mixture having a substantially negligible effect on the infrared response of the at least one foreground and background color mixtures, as well as having a substantially noticeable visual response under normal illumination of the at least one foreground color mixture and the at least one background color mixture, where an infrared mark is created by using the at least one foreground color mixture imaged as arranged in close spatial proximity against the at least one background color mixture, with a distraction pattern imaged using the at least one distraction color mixture as collocated with the at least one foreground color mixture in close spatial proximity against the at least one background color mixture.

12. The infrared mark of claim 11 further comprising where the foreground color mixture against the background color mixture is used to delineate variable data information.

13. The infrared mark of claim 12 further comprising where the distraction pattern using the distraction color mixture is used to delineate variable data information.

14. The infrared mark of claim 13 further comprising where the at least one background color mixture further comprises common carbon black toner.

15. The infrared mark of claim 14 further comprising where the at least one foreground color mixture is provided as entirely without common carbon black toner in its mixture.

16. A method for creation of an infrared mark to be printed by a printing device as an image on a substrate for embedding information in printed documents, the method comprising:
    providing a substrate reflective of infrared;
    selecting at least one background color mixture for the infrared mark;
    selecting at least one foreground color mixture for the infrared mark, the at least one foreground color mixture exhibiting low contrast against the at least one background color mixture under normal illumination, and high contrast against the at least one background color mixture under infrared illumination;
    selecting at least one distraction color mixture for the infrared mark, the at least one distraction color mixture comprised of at least two colors, the at least one distraction color mixture having a substantially negligible effect on the infrared response of the foreground and background color mixtures, as well as having a substantially noticeable visual response under normal illumination of the least one foreground color mixture and the least one background color mixture;
    printing the image background with the at least one background color mixture;
    printing the image foreground with the at least one foreground color mixture; and,
    overprinting a distraction pattern with the at least one distraction color mixture to create an infrared mark using the at least one foreground color mixture against the at least one background color mixture, with a distraction pattern using the at least one distraction color mixture as collocated with the at least one foreground color mixture against the at least one background color mixture.

17. The method for creation of an infrared mark of claim 16 further comprising selecting at least one overlap color mixture to print where the image foreground and distraction pattern overlap.

18. The method for creation of an infrared mark of claim 16 further comprising where the foreground color mixture against the background color mixture is used to delineate variable data text information.

19. The method for creation of an infrared mark of claim 18 further comprising where the distraction pattern using the distraction color mixture is used to delineate variable data text information.

20. The method for creation of an infrared mark of claim 16 further comprising where the at least one background color mixture further comprises common carbon black toner.

21. The method for creation of an infrared mark of claim 20 further comprising where the at least one foreground color mixture is provided as entirely without common carbon black toner in its mixture.

* * * * *